April 22, 1958     W. L. TEETER     2,832,004

BROAD BAND COAXIAL TRANSMITTER RECEIVER SWITCH TUBE

Filed Feb. 11, 1955

INVENTOR.
WALLIS L. TEETER

BY George Sipkin
George E. Pearson
ATTORNEYS

United States Patent Office 2,832,004
Patented Apr. 22, 1958

2,832,004

BROAD BAND COAXIAL TRANSMITTER RECEIVER SWITCH TUBE

Wallis L. Teeter, La Mesa, Calif.

Application February 11, 1955, Serial No. 487,724

3 Claims. (Cl. 315—39)

(Granted under Title 35, U. S. Code (1952), sec. 266)

The invention described herein may be manufactured and used by or for the Government of the United States of America for governmental purposes without the payment of any royalties thereon or therefor.

This invention relates to electrical discharge devices of the kind employing an ionizable gas in a discharge gap and in particular to a broad band coaxial transmitter receiver switch tube to be used with radar apparatus to protect the sensitive elements of a radar receiver from damage by signals of high power level from a radar transmitter. The need for this tube arises because of the use in radar systems of the same antenna for transmitting radar signals and receiving reflected or echo signals. Both the transmitter and the receiver are connected to the same antenna, the transmitter originating a signal of high power level for radiation by the antenna. To protect the sensitive elements of a receiver from damage when these high power signals are being transmitted to the antenna, it is necessary that a protective device such as the tube of the present invention be utilized.

One previous form of TR (transmitter-receiver) protective switching device comprises electrodes forming a discharge gap and an ionizable gas in the vicinity of the gap to facilitate the formation of an electrical discharge across the gap. Thus, when the transmitted high power signal attempts to pass through the transmission line connecting the antenna to the receiver, an electrical discharge is produced across the gap and in effect short circuits the receiver from the transmitter and antenna. In this way, the radar receiver is protected while the transmitter is in operation. All previous TR methods usable with a coaxial line, however, were of the narrow band type, i. e., one-tenth percent of the band width. Keep-alive electrodes for keeping the gas in a partially ionized state have previously been mounted in the space between the radio frequency carrier inner conductor and the outer transmission line. However, this arrangement causes corona discharge from the keep-alive to be coupled directly into the line and the noise thus generated would appear in the receiver. Those electrodes that were capped tended to concentrate the firing when the tube was under high power.

The present invention comprises a high power broad band coaxial transmitter receiver switching tube to cover a preselected range, for example, the 1220 to 1350 megacycle frequency band. The tube comprises a doughnut type construction having inner and outer rings which fit the inner and outer portions of a coaxial line with glass doughnuts fused at the end of these cylinders and exterior keep-alive structure consisting of electrodes spaced apart and mechanically connected to the interior of the tube. The electrodes are energized to keep the gas partially ionized with a negative charge so that the particles can more easily carry an initial current flow. The gas particles are de-ionized in time to permit passage of an echo return to the receiver. This tube is placed at one end of a T-junction where two arms of the junction go to the transmitter and the antenna and the third arm goes to the receiver. The tube is placed at such distance from the T-junction and along the receiver coaxial line that the wave length between the junction point and the first face of the tube will set up a field that is 180° out of phase with the original to effect a reflected short across the outer cylinder where the outer cylinder of the coaxial line leading to the receiver is attached.

It is a general object of the present invention to provide an improvement in transmitting receiving tubes and in particular tubes isolating the receiver from the coaxial line between the transmitter and the antenna.

It is a further object to provide an electronic switching tube which is relatively insensitive to wide variations of frequency. Another object is to provide a switching tube which will effectively short out the high power pulses from the transmitter to prevent them from being transmitted to the receiver.

A further object is the provision of a transmit receive switch tube which will permit the full passage of echo return signals from the antenna to the receiver.

Another object is to arrange the keep-alive electrodes of the tube so as not to generate noise thereby audible or visible in the receiver.

Other objects and many of the attendant advantages of this invention will be readily appreciated as the same becomes better understood by reference to the following detailed description when considered in connection with the accompanying drawings wherein.

Figure 1:
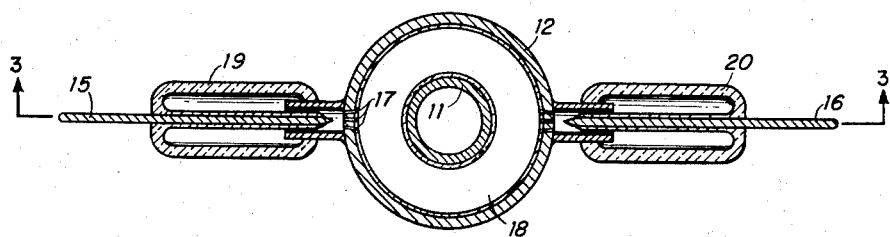
Fig. 1 is a cross-sectional view of the tube taken normal to the axis of the transmission line.
Figure 3:
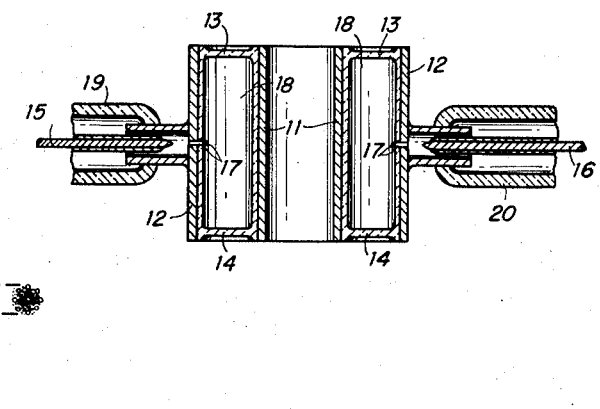
Fig. 3 shows a cross-sectional view of a tube taken along the line 3—3 of Fig. 1.
Figure 2:
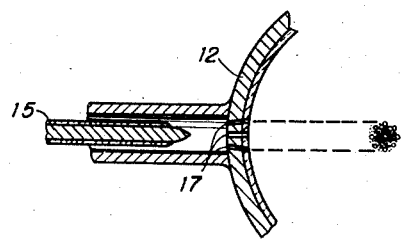
Fig. 2 is an enlarged view of the connection of the electrode to the main portion of the tube.
Figure 4:
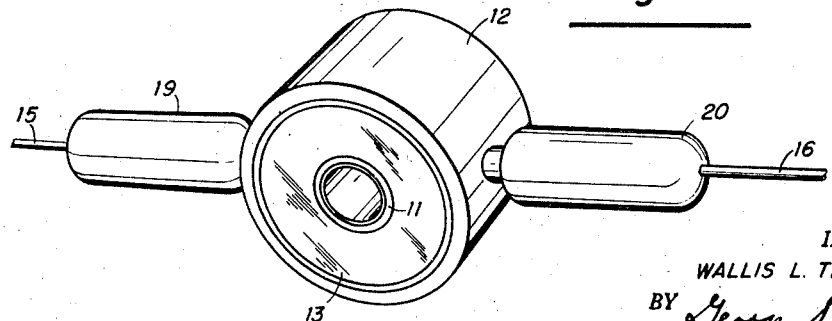
Fig. 4 is a perspective view of the switch tube.

Referring now to the drawings in which like numbers designate like parts in the several views, there is shown in Fig. 1 two concentric kovar or steel cylinders 11 and 12 of such diameters as to permit the tube to be mounted directly in a rigid coaxial line connecting a receiver to the transmit-receive antenna of a radar system. These cylinders are held in place by glass doughnut shaped windows 13, 14 fused to the cylinder ends. The inner surface of outer cylinder 12 and the outer surface of inner cylinder 11 are also glass coated to limit sputtering from the metal surfaces onto the glass windows 13, 14. The windows and cylinders thus form a container or chamber 18 which is filled with argon gas or some other suitable substance which may be ionized to more easily carry a current. The tube is of a low-Q type construction which offers the best advantages for broad band use. The low-Q design keeps the unfired insertion loss low and leaves band width limitations to the geometry of the T–R mount, although it limits the step-up ratio.

To avoid direct coupling of the corona discharge from the keep-alive electrodes into the coaxial line, with resultant generated noise appearing in the receiver, the keep-alive electrodes 15, 16 are mounted externally of the tube and, as shown, are placed 180° apart. These electrodes, except the very tips, are glass-coated. A series of small diagonal holes or conduits 17 are formed as by drilling into the gas chamber so as to permit the ions to spread evenly over about one-half of the doughnut. Auxiliary chambers 19, 20 about electrodes 15, 16 complete the enclosure to prevent gas leakage. This arrangement of the electrodes eliminates noise coupling. To obtain satisfactory ionization, two such electrodes are spaced 180° apart. A negative current on each electrode will partially ionize the gas in the tube with a negative charge. The amount of potential on the electrodes and subsequent degree of partial ionization determines the amount of isolation of the receiver from the transmitter pulses. However, a limitation in the variation of potential on the keep-alive electrodes resides in the fact that the gas must be de-ionized by the time the echo signal is returned to permit its passage to the receiver.

The receiver transmission line is joined to the transmitter line at a point one-half wave length (at the median of the broad band range of frequencies) from the transmitter. One-fourth wave length or multiple thereof from this junction point and along the receiver line is mounted the T–R switching tube. As the transmitted pulse reaches the junction point it goes toward the antenna and also to the T–R tube where it completes the ionization of the gas in chamber 18. This places an extremely low impedance in shunt with the coaxial line by setting up a field at the junction of the outer cylinders of the coaxial cable which is 180° out of phase with the original field, to effect a reflected short thereacross. In this manner the high-power radio frequency does not reach the receiver.

Obviously many modifications and variations of the present invention are possible in the light of the above teachings. It is therefore to be understood that within the scope of the appended claims the invention may be practiced otherwise than as specifically described.

What is claimed is:

1. A transmit-receive switch tube comprising a pair of sealed coaxial electrically conductive elements of similar configuration forming a gas tight chamber therebetween, voltage responsive means for effecting a low impedance electronic coupling between said elements, said means comprising an ionizable fluid contained within said chamber, an auxiliary sealed chamber in fluid communication with said first named chamber and disposed externally thereof, and means including an electrode disposed within said auxiliary chamber for ionizing the fluid within said auxiliary chamber and directing a divergent flow of ions into said first mentioned chamber.

2. In a coaxial transmission line comprising a section of elongated inner conductor and a similar section of elongated outer conductor surrounding said inner conductor, the improvement comprising means for providing a low impedance electrical path between said conductors in response to a predetermined voltage across said conductors, said means including a chamber having walls of dielectric material mounted between said conductors, an ionizable gas within said chamber, and means for maintaining a predetermined ion concentration within said chamber comprising diametrically opposed gas conduit means extending through said outer conductor and means including electrodes mounted and disposed externally of said outer conductor for projecting gas ions into said chamber through said conduit means.

3. A high frequency electric discharge tube adapted for mounting in a coaxial transmitter-receiver transmission system, said tube comprising an inner and outer conductor forming an air tight cavity therebetween, said cavity being filled with an ionizable gas, keep-alive electrodes mounted and disposed exteriorly of said outer conductor, conduit means in said outer conductor to permit the passage of said gas to the area adjacent the tip-ends of said electrodes, the inner walls of said outer conductor and the outer walls of said inner conductor being glass coated, conduit means in the glass coating adjacent the conduit means in said outer conductor, said electrodes being glass coated except the tip-ends thereof and sealing means around said electrodes to contain said gas.

References Cited in the file of this patent
UNITED STATES PATENTS

| | | |
|---|---|---|
| 2,423,998 | Schantz | July 15, 1947 |
| 2,499,777 | Pound | Mar. 7, 1950 |
| 2,582,202 | Jacob | Jan. 8, 1952 |
| 2,632,867 | Garoff et al. | Mar. 24, 1953 |
| 2,678,408 | Roberts | May 11, 1954 |